(No Model.)

J. LANG & A. FISCHER.
VEHICLE TIRE.

No. 566,588. Patented Aug. 25, 1896.

Witnesses:
Chas. E. Gaylord
Hiram Smith

Inventors:
Jules Lang
August Fischer
By Dyrenforth & Dyrenforth,
Attys.

UNITED STATES PATENT OFFICE.

JULES LANG AND AUGUST FISCHER, OF CHICAGO, ILLINOIS.

VEHICLE-TIRE.

SPECIFICATION forming part of Letters Patent No. 566,588, dated August 25, 1896.

Application filed January 15, 1896. Serial No. 575,656. (No model.)

*To all whom it may concern:*

Be it known that we, JULES LANG, a citizen of France, and AUGUST FISCHER, a citizen of the United States, residing at Chicago, in the county of Cook and State of Illinois, have invented a new and useful Improvement in Tires, of which the following is a description.

Our invention relates to an improvement in tires for road-vehicles generally, though we have especially devised it as a bicycle-tire, our object being to provide a tire which, besides possessing the attributes of lightness and durability, shall be as little affected injuriously by puncturing as a solid or "cushion" tire and shall possess the elasticity of the pneumatic tire, without requiring, to that end, that it be inflated by pumping air into it. To this end we construct the body of our tire of any suitable light material, as wood, metal, or rubber tubing, or the like, but preferably of solid cork, with the outer circumference of the annular body flattened. About this flattened circumference we fasten a rubber cushion of peculiar construction, involving a transversely concavo-convex body having a longitudinal central rib of elastic rubber, like the body, whereby when the cushion is fastened in place it affords a tread on the tire which is highly elastic, its elasticity being due to the rubber out of which it is formed bearing, at three cross-sectional points, against the body of the tire, and to the air which is contained within the cushion in the chambers formed at opposite sides of the longitudinal rib. If the body of the tire be composed of cork, to render it waterproof we envelop it in a covering of waterproofed fabric, cemented in place, and which need only extend to the edges of the cushion. The tire thus formed is incased in a suitable covering, preferably of canvas, fastened in place, as by cementing.

Figure 1:
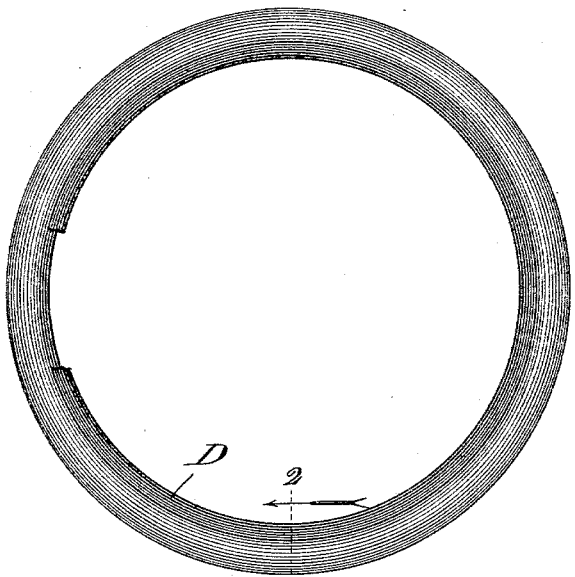
Figure 2:
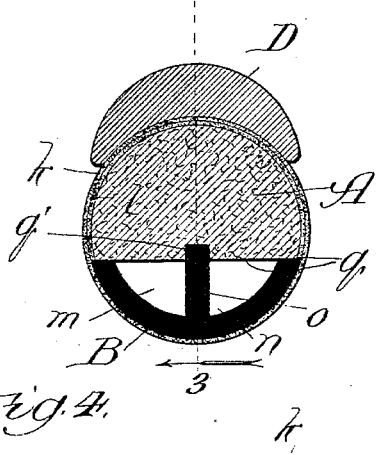
Figure 3:
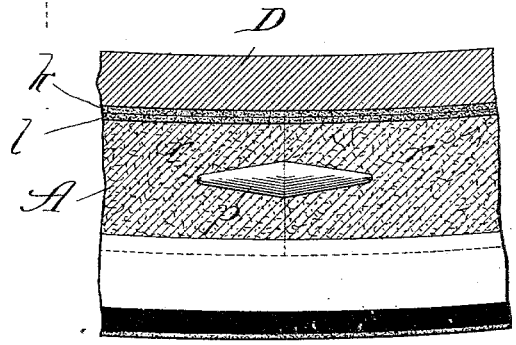
Figure 4:
Figure 5:
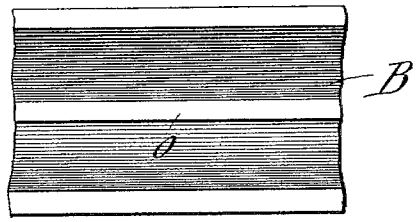

Referring to the accompanying drawings, Figure 1 shows a bicycle-tire of our improved construction seated in a bicycle-rim, with a section broken out. Fig. 2 is an enlarged broken cross-section of the same, the section being taken at the line 2 on Fig. 1 and viewed in the direction of the arrow; Fig. 3, a section taken at the line 3 on Fig. 2 and viewed in the direction of the arrow; Fig. 4, a face view of a section of the body portion of the tire, and Fig. 5 a plan view of the inner side of a section of the rubber cushion.

A is the body portion of our improved tire, which is applied to the concave outer circumference of a wheel-rim D, in which it should be cemented, and the ends of the tire may be fastened together, as by cementing or tying them after its adjustment on the rim.

Since, as hereinbefore stated, we prefer to form the body A of our improved tire of cork, but without intention of limiting our invention to the employment of that particular material, we confine the detailed description of that element in our improved construction to its manufacture of the substance known as "cork."

We employ sections of cork $r$, of desired length, say a foot or more. These sections are fastened together end to end to form therewith an annulus of desired diameter, as by means of dowel-pins, one of which is shown at $p$ in Fig. 2. This annulus should be flattened about its periphery, as shown at $q$, and provided with a central circumferential recess $q'$ to afford a seat for the cushion B, which is molded out of rubber of the same variety as that out of which it is common to manufacture pneumatic tires, and is of concavo-convex form throughout, with a longitudinal rib $o$, of the same material, formed centrally upon its concave side. The cushion B is fastened at its outer edges to the flattened surface of the tire-body A, with its rib $o$ entering the recess $q'$, preferably by cementing it in place. Thus at opposite sides of the rib the body forms with the cushion B air-chambers $n$ and $m$, in which, the cushion being endless when fastened in place, air is confined, though without requiring that it be forced into the chambers, since it may be normally atmospheric pressure, though when the wheel is in use the weight of the rider compresses the air in the chambers, whereby the advantage of its rebounding action is afforded.

To render the cork of the body A waterproof, we cement upon it a covering $l$ of waterproofed fabric, which, however, need extend only to or about to the edges of the cushion. The whole is incased in a covering $k$, preferably of canvas, which may be fastened in place with suitable cement.

What we claim as new, and desire to secure by Letters Patent, is—

1. A tire comprising, in combination, the annular tire-body A adapted to seat on a wheel-rim and flattened about its outer circumference, but otherwise cylindrical in cross-section, and a cushion B of rubber formed concavo-convex in cross-section with a longitudinal rib $o$ extending from its concave surface and cemented about its side edges and said rib to the flattened surface of the tire-body, and forming therewith the air-chambers $n$ and $m$ at opposite sides of the rib, substantially as described.

2. A tire comprising, in combination, the annular body portion A of cork having a flattened and recessed outer circumferential surface, and incased in a covering $l$ of waterproof fabric, a cushion B of rubber, formed concavo-convex in cross-section with a longitudinal rib $o$ extending from its concave surface and cemented along its outer edges and said rib to the flattened surface of the body portion thereof forming the air-chambers $n$ and $m$ at opposite sides of the rib, and a covering $k$ enveloping said body portion and cushion, substantially as described.

JULES LANG.
AUGUST FISCHER.

In presence of—
J. N. HANSON,
BRUCE S. ELLIOTT.